United States Patent [19]

Kingsley et al.

[11] Patent Number: 4,564,209
[45] Date of Patent: Jan. 14, 1986

[54] TRAILER HITCH ASSEMBLY

[76] Inventors: Bertis N. Kingsley; Ronald D. Fisher, both of P.O. Box 1010, Centralia, Ill. 62801

[21] Appl. No.: 534,612

[22] Filed: Sep. 22, 1983

[51] Int. Cl.⁴ .............................................. B60D 1/18
[52] U.S. Cl. ..................................... 280/468; 180/199; 180/203; 280/475; 280/478 R; 280/490 R; 280/766.1
[58] Field of Search ................ 280/456 R, 467, 468, 280/475, 478 R, 479 R, 490 R, 766.1; 180/199, 203

[56] References Cited

U.S. PATENT DOCUMENTS

| | | | |
|---|---|---|---|
| 2,917,323 | 12/1959 | Mandekic | 280/470 |
| 3,269,751 | 8/1966 | Whattoff | 280/490 R |
| 3,865,406 | 2/1975 | Dutton | 280/490 R |
| 3,891,239 | 6/1975 | Leo et al. | 280/468 |
| 3,993,206 | 11/1976 | Jomen et al. | 280/468 |
| 4,000,911 | 1/1977 | Weber | 280/468 |
| 4,057,265 | 11/1977 | Grace | 280/468 |
| 4,214,772 | 7/1980 | Carr et al. | 280/470 |
| 4,266,809 | 5/1981 | Wuerflein | 280/766.1 |

*Primary Examiner*—Joseph F. Peters, Jr.
*Assistant Examiner*—Kenneth R. Rice
*Attorney, Agent, or Firm*—Cohn, Powell & Hind

[57] ABSTRACT

This hitch assembly includes a frame which is fixedly attached to the rear of a truck and extends widthwise of the truck to provide upper and lower horizontal rails. A transverse carriage having upper and lower roller assemblies engageable with the rails is mounted to the frame and moved laterally relative to the frame by means of a ram assembly. The ram assembly includes a piston extending from end-to-end of the frame and a cylinder which is fixedly attached to the carriage and movably mounted to the piston. A vertical lift carriage is slidably mounted to the transverse carriage and is movable vertically relative to the frame by a ram assembly. The vertical carriage includes a hitch ball for attachment of a trailer tow bar and the transverse and vertical carriages provide the hitch connection and the tow bar with vertical and laterally horizontal components of movement. A support is provided for the vertical carriage so that when desired the rear of the truck can be raised and moved both transversely and vertically relative to the hitch connection while the trailer is stationary to provide additional movement.

18 Claims, 10 Drawing Figures

TRAILER HITCH ASSEMBLY

BACKGROUND OF THE INVENTION

This invention relates generally to hitch assemblies and particularly to an adjustable hitch assembly attached to the rear of a towing vehicle for towing a heavy trailer such as a mobile home, the hitch assembly providing horizontal and vertical movement capability for the hitch connection.

It is necessary, under some circumstances, to maneuver towed trailers into positions that cannot readily be accomplished with a simple hitch attachment. For example, there are situations in which obstacles in the path of the trailer cannot be avoided without the versatility provided by movement of the hitch connection relative to the towing vehicle. The need for compound movement of the hitch connection is particularly apparent in the case of mobile home modular units which must be accurately positioned so that the modular half units can be connected together.

The prior art includes several patents which are directed to the provision of a hitch assembly having movement capability relative to the towing vehicle. U.S. Pat. No. 3,865,406 and U.S. Pat. No. 3,269,751 show adjustable hitches with a vertical movement capability. U.S. Pat. No. 2,917,323 and U.S. Pat. No. 4,214,772, on the other hand, show hitches with lateral movement capability.

U.S. Pat. No. 4,000,911 discloses a hitch assembly providing the hitch ball with compound movement capability including movement laterally of the towing vehicle, vertically of the towing vehicle and in a fore and aft direction relative to the towing vehicle. This hitch assembly probably provides the most pertinent prior art. However, because of the particular arrangement of the carriage relative to the frame of the towing vehicle the lateral movement is quite limited amounting to only plus or minus four and one half inches ($4\frac{1}{2}$"). Further, the use of a carriage mounted on slide bars provides insufficient freedom of movement. Finally, the provision of fore and aft movement unnecessarily complicates the hitch assembly and increases the expense.

The present hitch assembly overcomes these and other problems in a manner not disclosed in the known prior art.

SUMMARY OF THE INVENTION

This hitch assembly is particularly useful in connection with the towing and maneuvering of heavy trailers, such as mobile home modular units, which require accurate positioning of interconnectible mobile home portions, not possible with a simple hitch assembly. The hitch assembly is adjustable in that the hitch ball connection, and hence the trailer tow bar, can be moved laterally and vertically relative to a stationary towing vehicle. In addition the towing vehicle can be moved laterally and vertically when the trailer is maintained in a stationary condition.

The hitch assembly includes a frame fixedly mounted to the towing vehicle. A transverse carriage is mounted to the frame and means are provided for moving the transverse carriage relative to the frame, such means including an elongate member mounted between the frame ends, movable means carried by the elongate member and attached to the transverse carriage, and means for moving the movable means and the transverse carriage together relative to the frame. A vertical lift carriage is mounted to the transverse carriage and means are provided for moving the vertical lift carriage relative to the transverse carriage.

It is an aspect of this invention to provide a lateral ram assembly disposed between the frame and the transverse carriage for moving the transverse carriage relative to the frame, the ram assembly including an elongate piston extending on both sides of the carriage and being connected at its ends to the frame, the piston having a piston head disposed intermediate the piston ends and a cylinder attached to the carriage for movement of the cylinder and the carriage relative to the piston. It is also an aspect of this invention to provide a vertical ram assembly disposed between the frame and the transverse carriage for movement of the vertical carriage relative to the transverse carriage.

In one aspect of this invention, the transverse carriage is disposed on one side of the frame and the ram assembly is disposed on the other side of the frame, the frame including a web having an elongate horizontal slot and the attachment of the ram assembly cylinder to the transverse carriage including means extending through the slot so that the ram assembly is protected by the frame.

It is another aspect of the invention to provide the frame with outrigger members having end portions extending beyond the upper and lower portions of the frame to provide additional lengthwise movement of the ram assembly cylinder relative to the frame.

It is yet another aspect of this invention to provide that the transverse carriage includes a housing having a lower portion and an upper portion the vertical ram assembly cylinder being mounted within the upper housing portion above the vertical lift carriage and having a depending piston connected to the vertical lift carriage so that the vertical ram assembly is protected by the carriage housing.

It is still another aspect of this invention to provide that the upper portion of the frame includes a horizontal rail assembly and that the transverse carriage includes upper roller means engageable with the rail assembly to provide a smooth rolling action between the transverse carriage and the frame.

It is yet another aspect of this invention to provide that the frame lower portion includes a horizontal rail assembly and the transverse carriage includes upper roller means and lower roller means selectively engageable with the rail assembly so that when the frame is raised relative to the carriage assembly there is a smooth rolling action between the carriage and frame.

It is another aspect of this invention to provide that the upper and lower roller means include side rollers, the upper roller means providing opposed side rollers selectively engageable with the upper rail assembly to prevent galling between the web plate and the frame.

It is another aspect of this invention to provide a ground engageable support which can be disposed below the hitch connection for selectively carrying the vertical lift carriage so that the frame and the attached towing vehicle can be raised relative to said vertical lift carriage.

It is an aspect of this invention to provide a method of maneuvering a towing vehicle and trailer combination so that the trailer and towing vehicle are alternatively movable relative to each other to provide additional movement capability, the method comprising the steps of moving the hitch ball and the connected tow bar laterally to swing the trailer about the rear end; lowering the hitch ball and connected tow bar onto a support; raising the rear end of the towing vehicle relative to the hitch ball; moving the towing vehicle laterally to swing the towing vehicle about the front end; lowering the rear end of the towing vehicle and removing the support.

DESCRIPTION OF THE PREFERRED EMBODIMENT

Figure 1:
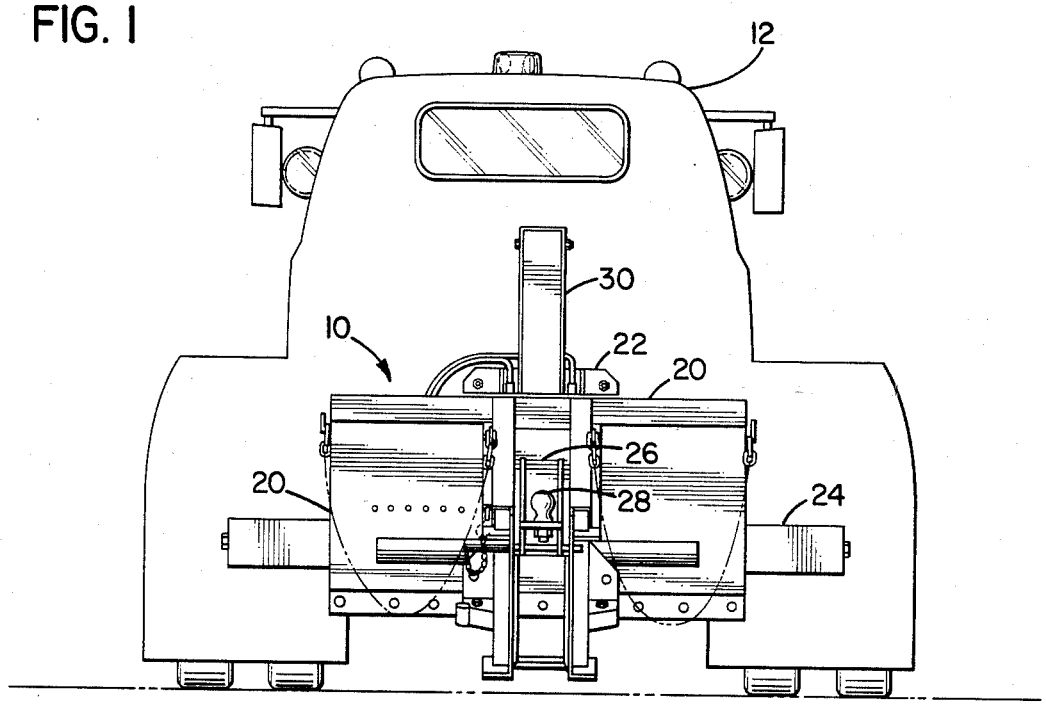
FIG. 1 is a front elevational view of the hitch assembly as mounted to the rear of a truck.
Figure 2:
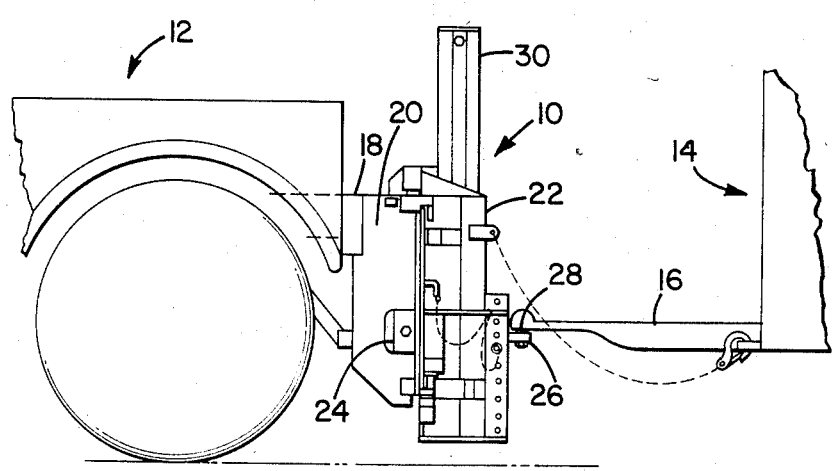
FIG. 2 is a fragmentary side elevational view of the hitch assembly having a trailer attached thereto.

Referring now by reference numerals to the drawings and first to FIGS. 1 and 2 it will be understood that the hitch assembly generally indicated by numeral 10 is carried by a towing vehicle such as the truck 12 for towing a trailer such as a mobile home 14 having a tow bar 16. The hitch assembly 10 consists essentially of a frame 20, which is fixedly mounted to a reinforced truck frame 18; a transverse carriage 22, mounted to the frame 20 and movable laterally by means of a ram assembly 24; a vertical lift carriage 26, including a hitch ball 28, said lift carriage being mounted to the transverse carriage 16 in vertically movable relation by means of a vertical ram assembly 30. This structural arrangement of parts provides vertical and horizontal movement components for the hitch ball 28 and the mobile home 14 and permits the extensive vertical and horizontal movement which is required to maneuver a mobile home into position and is particularly useful during the setting up of adjacent mobile home halves.

Figure 4:
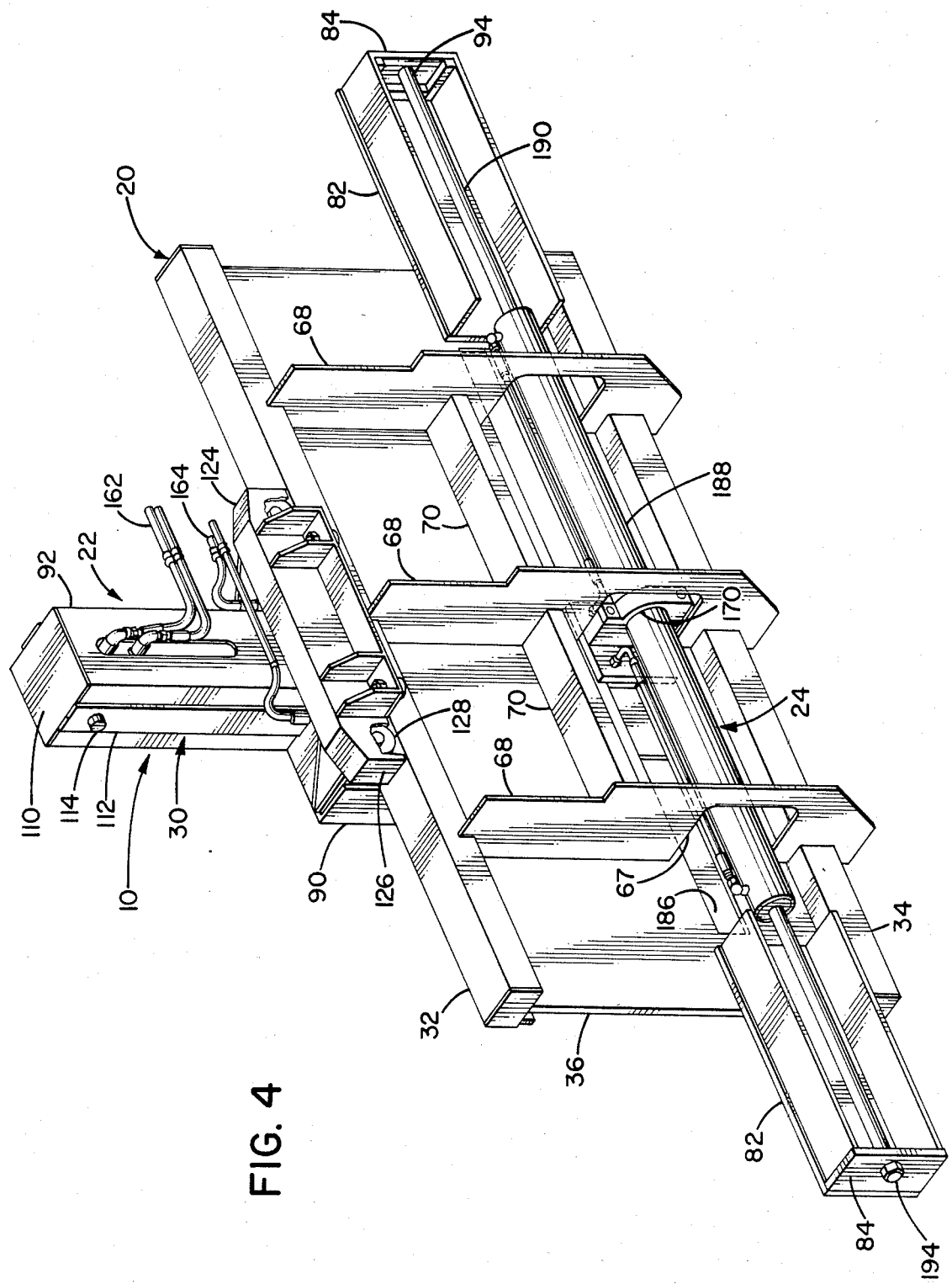
FIG. 4 is an enlarged rear perspective view thereof.
Figure 5:
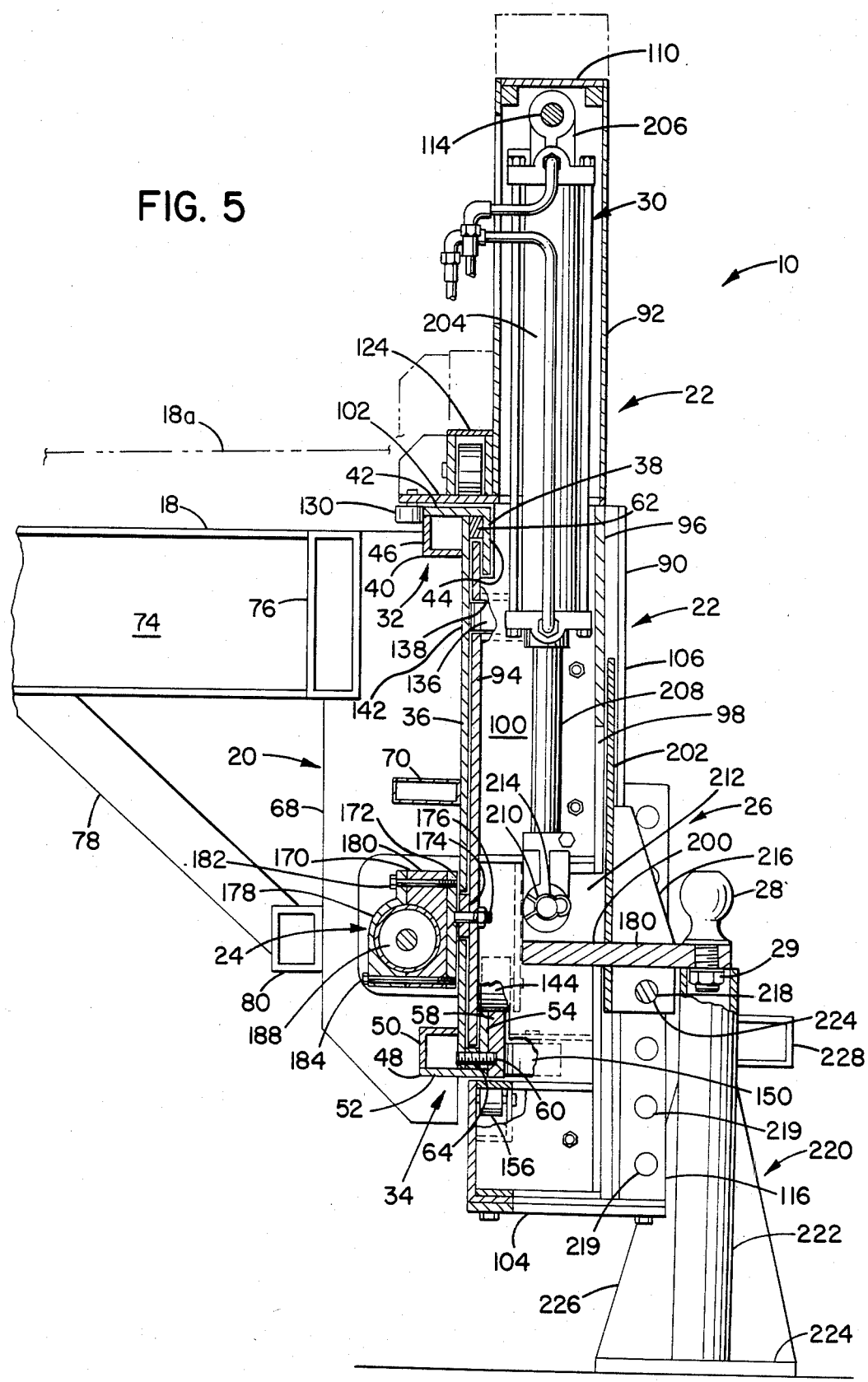
FIG. 5 is an enlarged cross sectional view through the center of the hitch assembly.

The hitch assembly 10 will now be more specifically described with reference to FIGS. 3, 4 and 5. In the embodiment shown, the frame 20 includes an upper horizontal portion 32, a lower horizontal portion 34 and an intermediate web portion 36 interconnecting said upper and lower portions as by welding. As best shown in FIG. 5, the upper portion 32 includes interconnected large and small L-shaped members 38 and 40 respectively providing a horizontal leg 42 a downwardly depending leg 44 spaced from the web 36, a fill element 62 being disposed within the gap, and a vertical leg 46. The legs 42 and 46 provide laterally horizontal and vertical rail surfaces engageable by rollers as will be described and cooperate to provide a reinforcing box member for the upper portion 32. The lower portion 34 also includes interconnected larger and smaller L-shaped members 48 and 50 respectively providing a horizontal leg 52 and an upwardly extending leg 54 spaced from the web 36, a fill element 64 being disposed within the gap, and having a vertical thickening plate 58 attached thereto as by fasteners 60. The members 48 and 50 cooperate to provide a reinforcing box member. The horizontal leg 52 and the thickening plate 58 provide horizontal and vertical rail surfaces and the leg 54 and plate 58 cooperate to provide a second horizontal rail surface, said rail surfaces being engageable by rollers as will be described. The frame 20 also includes a plurality of vertical stiffener members 68, three in number in the preferred embodiment, and horizontal stiffener members 70 extending between said vertical stiffeners. The vertical stiffeners 68 as best shown in FIG. 5 provide a means of connecting the frame 20 to the truck frame 18 and are provided with openings 67 as shown in FIG. 4 to receive the ram assembly 24. The truck frame 18 consists essentially of a pair of rearwardly extending frame members 74, interconnected by a transverse box member 76, and a pair of diagonal brace members 78 interconnected by a box member 80. The box members 76 and 80 are fixedly attached as by welding directly to the stiffeners 68 to provide rigidity to the frame 20 on which the transverse carriage 22 is mounted. As best shown in FIG. 4 the frame 20 also includes a pair of opposed channel shaped outrigger members 82 welded or otherwise attached to the web 36, and having end plates 84 to which the horizontal ram assembly 24 is connected as will be described.

The transverse carriage 22 includes a housing or body providing a lower housing portion 90 and an upper housing portion 92. The lower housing 90 includes a rear plate 94 having upper and lower ends received in the track provided by the space between the web 36 and upper and lower legs 44 and 54 of the frame 20. The carriage 22 also includes a front plate 96 having a lower slotted portion 98 to receive the vertical lift carriage 26, said front and rear plates being interconnected by side plates 100. The lower housing 90 also includes an apertured cap plate 102 and a U-shaped base 104. Extending between the cap plate 102 and the base plate 104 are opposed L-shaped members 106 attached to the side plates 100 as by fasteners, having front legs 108 spaced from the front plate 96 to provide a track receiving the vertical lift carriage. The upper housing 92 is generally box-shaped and is attached, as by welding, to the lower housing cap plate 102. The upper housing 92 is open at the lower end and includes a cap plate 110 at the upper end and reinforcing side plates 112 which receive the support pin 114 of the vertical ram assembly as will be described.

Figure 9:
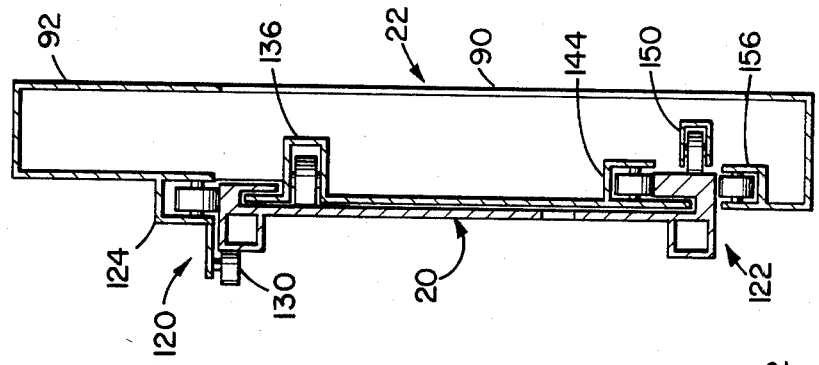
FIG. 9 is a simplified view showing the transverse carriage roller arrangement.

As shown by reference to FIGS. 5 and 9, the transverse carrige 22 includes upper and lower roller assemblies 120 and 122. The upper roller assembly 120 includes a first roller set 124 consisting essentially of a U-shaped housing 126, welded or otherwise attached to the upper housing 92 and having a pair of rollers 128 bearingly engageable with the horizontal rail surface provided by the of the frame leg 42; a second roller set 130 consisting essentially of an extended portion 132 of the cap plate 102 and a pair of rollers 134 mounted to the underside of said portion 132 and bearingly engageable with the vertical rail surface provided by the frame leg 46; and a third roller set 136 consisting of a pair of housings 138 welded or otherwise attached to the carriage rear plate 94 and providing a pair of rollers 140 mounted to the housings 138 and extending through apertures 142 in said rear plate 94 for engagement with the rail surface provided by the frame web 36.

The lower roller assembly 122 includes a first roller set 144 consisting essentially of a pair of U-shaped housings 146 welded or otherwise attached to the carriage rear plate 94 and having a pair of rollers 148 bearingly engageable with the rail surface provided by the upper surface of the combined vertical leg 54 and thickening plate 58; a second roller set 150 consisting essentially of a pair of housings 152, welded or otherwise attached to the carriage side plates 100 and providing a pair of rollers 154 bearingly engageable with the rail surface provided by the thickening plate 58; and a third roller set 156 consisting of a pair of housings 158, welded or otherwise attached to the transverse carriage side plates 100 each having a roller 160 engageable with the rail surface provided by the frame lower portion leg 52 and thickening plate 58.

The transverse carriage 22 is moved laterally relative to the frame 20 by means of the horizontal ram assembly 24 disposed on the opposite side of the frame to the carriage 22. The ram assembly 24 is connected to the carriage by a collar 170 having a back plate 172 and a spacer 174, which are attached to the carriage rear plate 94 as by a pair of bolts 176. The collar 170 provides a two-piece block consisting of portions 178 and 180 which are attached to the back plate 172 as by elongate threaded fasteners 182 and 184. The collar spacer 174 extends through an elongate slot 186 provided in the web plate and sufficient clearance is provided so that the collar 170 can move freely with the transverse carriage 22, to which it is attached, relative to the frame 20.

The collar 170 provides the means of securely attaching the cylinder 188 of the horizontal ram assembly 24 to the transverse carriage 22. The ram assembly 24 also includes a piston rod 190, having a single piston head 192, the piston rod 190 is threaded at opposite ends and connected to the end plates 84 of the outrigger frame extensions 82 as by nuts 194 so that the piston head 192 is centered relative to the frame 20. The piston rod 190 provides an elongate member mounted between the ends of the frame 20 and the cylinder 188 is movably mounted to said piston rod. As shown schematically in FIGS. 6, 7 and 8 this structural arrangement of parts provides the transverse carriage 22 with maximum movement relative to the frame 20 and the movement capability of the carriage 22 is much enhanced by the provision of the elongate cylinder 188 which extends on both sides of said carriage providing double the carriage movement that would be available with a ram assembly on only one side of the carriage. In the embodiment shown the lateral movement capability is sixteen inches (16") on each side of the longitudinal axis of the truck to provide an overall lateral movement of thirty-two inches (32"). As clearly shown in FIG. 3 the carriage 22 is provided with removable pins 196 which selectively engage a plurality of longitudinally aligned openings 198 and serves to hold the transverse carriage 22 securely in a selected position relative to the frame 20 when moved into said position by the ram assembly 24. The hydraulic lines for the horizontal ram assembly are indicated in FIG. 4, for example, by 162 and are, in the embodiment shown, supplied from the hydraulic system of the truck (not shown) and thereby provide a means of moving the cylinder on the piston rod. Safety chains 86 are provided between the carriage 22 and the tow bar 16.

Figure 3:
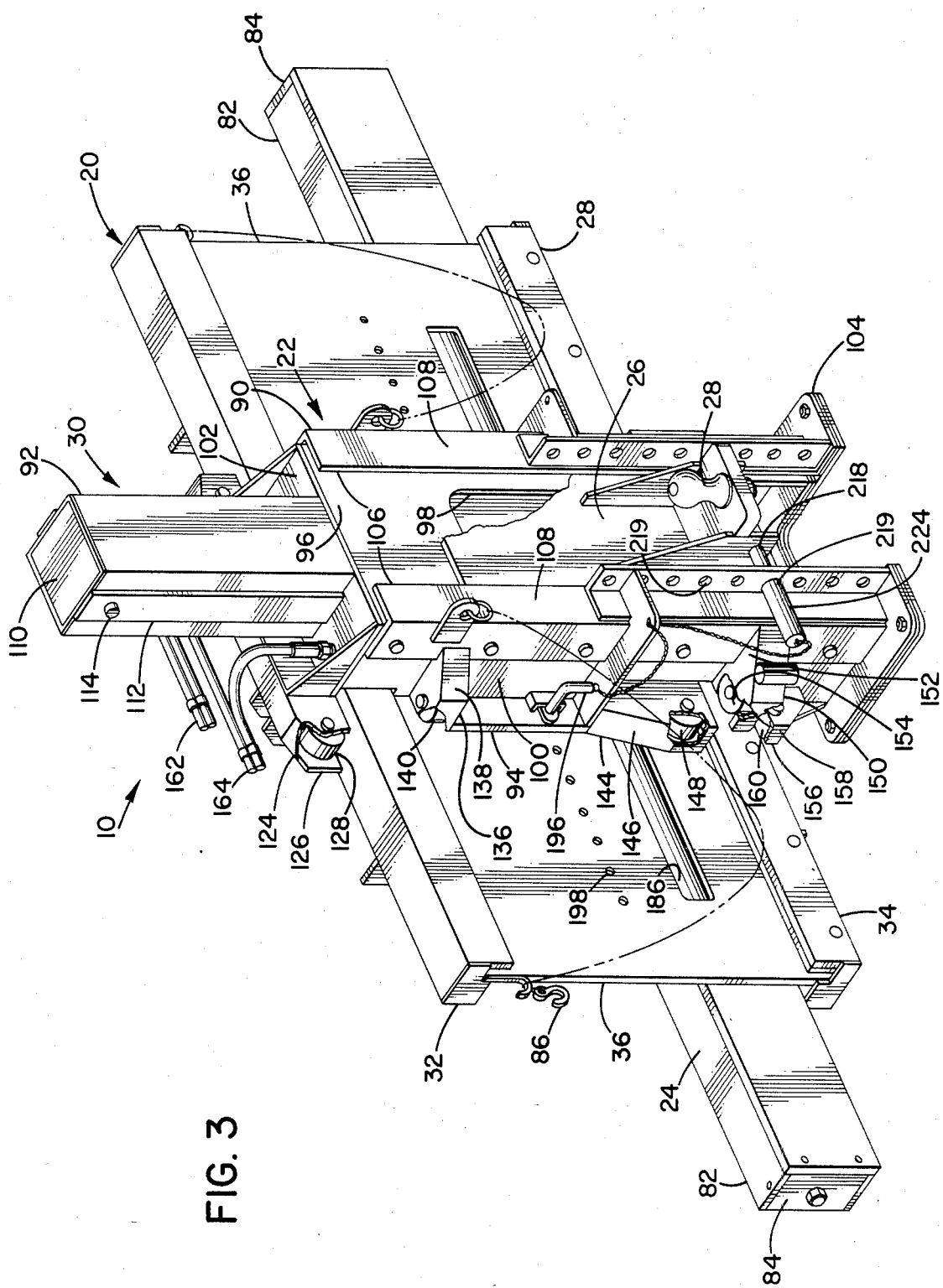
FIG. 3 is an enlarged front perspective view of the hitch assembly.

The vertical lift carriage 26, best shown by reference to FIGS. 3 and 5, includes a base plate 200, on which the hitch ball 28 is mounted, and a vertical sliding plate 202, the side edges of which are received within the track provided by the cooperation between the vertical L-shaped members 106 and the front plate 96.

The vertical ram assembly 30 is housed within the transverse carriage upper housing 92 and includes a cylinder 204 having a connector eye 206 at the upper end receiving the support pin 114 carried by said housing 92. The ram assembly piston 208 includes a connector eye 210 and a pair of spaced rear brackets 212, attached to the carriage base plate 200 and vertical sliding plate 202, as by welding, provides a clevis receiving the connector eye 210 and said eye is effectively attached to the carriage as by a pin 214. A pair of spaced front brackets 216 is attached to the sides of the base plate 200, as by welding, said brackets including apertures 218 which are selectively aligned with one of the vertical row of openings 219 provided on a pair of L-shaped spaced brackets 116 attached to the front of the transverse carriage 24, as by welding, and removable pins 224 provide a means of selectively holding the vertical lift carriage 26 to the transverse carriage 22. The hydraulic lines for the vertical ram assembly are indicated in FIG. 4, for example, by 164 and are, in the embodiment shown, supplied by the hydraulic system of the truck (not shown).

As will be readily understood the vertical lift carriage 26, which is connected to the mobile home tow bar 16, provides a means of raising the front end of the mobile home 14 so that it can be more easily transversely moved by the carriage 22 and pivoted about its wheels. However, in addition, it is possible to raise the rear of truck 12 by means of the vertical ram assembly as will now be described.

Referring to FIG. 5 it can be seen that the vertical lift carriage 26 is provided with a stand 220 constituting a support and consisting essentially of a tube 222 having an open end, receiving the nut 29 of the ball hitch 28, and a ground engaging base 224, reinforcing stiffeners 226 being provided between said base and tube and a handle 228 being provided on said tube. This structural arrangement of parts provides that the entire rear end of the truck 12 can be raised by extending the ram assembly 26 to the position shown in phantom outline in FIG. 5, so that the truck 12 is supported only by its front wheels. In this condition, with the transverse carriage 22 effectively stationary, the frame 14, fixedly attached to the end of the raised truck 12 can be moved so that the truck rear end is pivoted about the front wheels relative to the stationary mobile home 14.

Because of this capability it is possible to provide a great maneuverability between the truck and the mobile home and, by alternately raising and lowering the truck 12 and the mobile home 14 both vehicles can be selectively moved into various positions.

Figure 10:
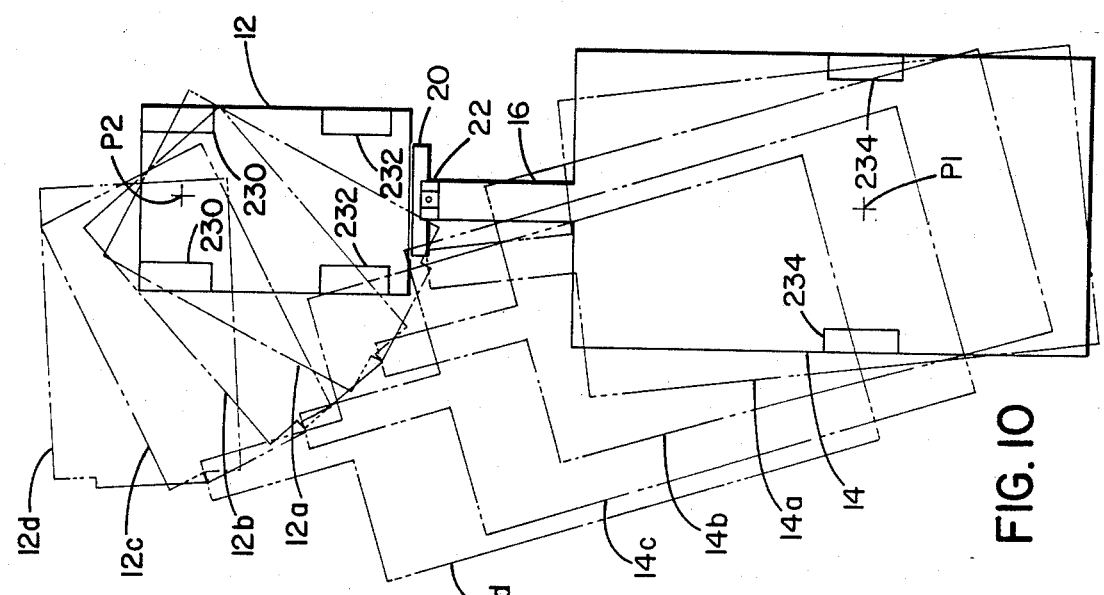
FIG. 10 is a diagrammatic view showing relative positions of the truck and mobile home during maneuvering.

An illustration of this capability is shown in FIG. 10. As shown it will be presumed that the truck 12 and mobile home 14 are initially aligned with the hitch ball 28 centered relative to the frame 20 and the tow bar 16. The truck 12 is initially stationary with the front wheels 230 and the rear wheels 232 on the ground. The mobile home 14 is likewise stationary with the wheels 234 on the ground. In this condition the transverse carriage 22 can be moved to the left taking the tow bar 16 with it so that the mobile home 14 pivots about a pivot center P1 generally defined by its wheels 234, to a position 14a. Following this, the stand 210 is placed in position under the hitch ball 28 and the lift carriage lowered onto said stand. The rear wheels 232 of the truck 12 can now be raised from the ground by extending the vertical lift carriage ram assembly 26. With the mobile home 14 stationary the truck 12 can now be moved to the left by moving the frame 20 relative to the transverse carriage 22 so that the truck pivots about a pivot center P2 defined by its front wheels 230 to a position 12a. The truck rear wheels 232 can now be lowered into ground engagement. In this condition, with the mobile home 14 located to the right of the truck 12 the process can be repeated so that the trailer and truck are moved alternately into positions 14b and 12b; 14c and 12c; 14d and 12d at which time the truck and the trailer have been moved a distance much greater than that which would be possible without employing the stand 220 to permit the truck as well as the trailer to be maneuvered.

It is thought that the structural features and functional advantages of this improved hitch assembly have become fully apparent from the foregoing description of parts but for completeness of disclosure the use of the hitch assembly will be briefly described.

As shown in FIG. 5, the hitch assembly frame 20, complete with outrigger members 82, is fixedly attached to the reinforced frame 18 of the truck 12. The transverse carriage 22, with the vertical lift carriage 26 and the vertical ram assembly 30 in place, is mounted to the frame 20 such that the frame front plate 96 is received in the track formed by the gap between the frame web 36 and the upper and lower vertical legs 44 and 54. The transverse carriage upper roller assembly first roller set 124 engages the horizontal rail provided by the frame leg 42 while the second roller set 130 and the third roller set 136 are engageable with the vertical leg 56 web 30 respectively. In the embodiment shown the rollers of the second and third roller sets are spaced slightly from these members to provide a small amount of play when the web 36 is centered. The transverse carriage lower roller assembly first roller set 144 is engageable with the upwardly extending frame leg 54 and the thickening plate 58, while the second roller set 150 is engageable with the front face of said thickening plate. The third roller set 156 is initially spaced from the horizontal rail surface provided by the leg 52 but engage this leg when an upward force is applied to the transverse carriage 22. Such an upward force is provided when the stand 210 is in place, as shown in FIG. 5, and the rear end of the truck 12 together with the frame 20 and the carriage 22 are raised by the vertical ram assembly 30.

Figure 6:
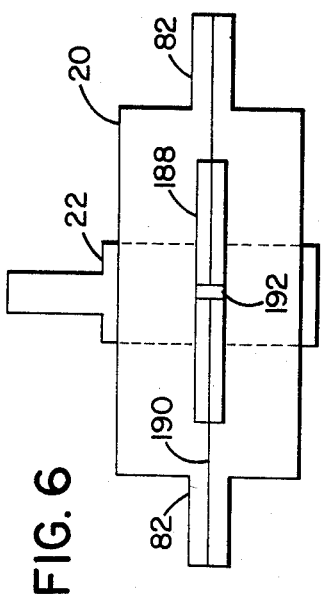
FIGS. 6, 7 and 8 are schematic views showing the transverse carriage and lateral ram assembly in intermediate and end positions relative to the carrying frame.
Figure 7:
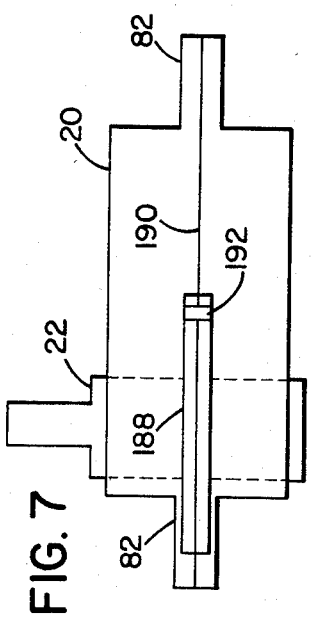
Figure 8:
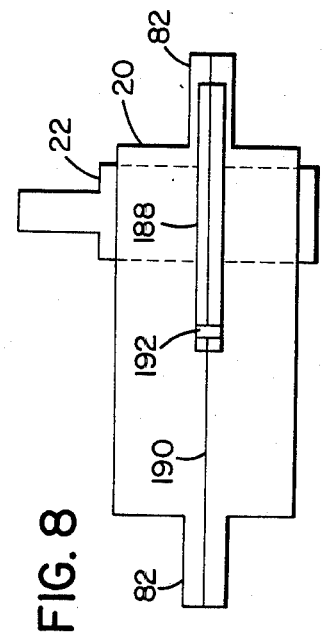

When the transverse carriage 22 is mounted to the frame 20 the lateral ram assembly cylinder 188 is fixedly attached to the carriage 22 on the opposite side of the frame 20. This attachment is achieved by means of the collar assembly which includes the spacer 174 which rises within the elongate slotted web slot 186. The ram assembly piston ends 194 are fixedly attached to the associated ends 184 of the outrigger member 182 such that, as shown in FIG. 6, the piston head 192 is centered relative to the frame 20. As shown in FIGS. 7 and 8, when hydraulic fluid is supplied by the truck to one side of the cylinder 188, the cylinder, together with the attached carriage 22 moves in one direction and when fluid is supplied to the other side of said cylinder, said cylinder moves in the other direction. The ends of the slot 186 effectively limit the stroke of said cylinder on the piston rod thereby effectively controlling the range of movement of the transverse carriage 22.

This single cylinder compound piston arrangement provides much greater movement than would be possible with side ram assemblies on one side of the carriage. Further, the extent of movement is augmented by the provision of the outrigger members 182 which effectively extend the distance the cylinder and hence the carriage 22 can be moved laterally. As will be readily understood the removable pins 196 and 216 provide a means of locking the transverse carriage 22 and the vertical lift carriage 26 in selected positions.

When additional manueverability of the truck 12 and the mobile home 14 are required such movement can be achieved in stages, as shown in FIG. 10, by first swinging the mobile home 14 about its wheels 234 and then supporting the lift carriage on the stand 220 so that the rear end of the truck can be raised and pivoted about its front wheels 230. This ease and versatility of movement provides that the mobile home can readily be positioned exactly as required even within the tightest space restrictions and can be readily moved to avoid obstructions.

We claim as our invention:

1. A hitch assembly for attachment to a towing vehicle for towing a trailer, the assembly comprising:
  (a) a frame fixedly mounted to the towing vehicle and including an upper portion, a lower portion and means connecting said upper and lower portions,
  (b) a transverse carriage mounted to the frame,
  (c) a horizontal ram assembly disposed between the frame and the transverse carriage for moving the transverse carriage laterally relative to the frame, said ram assembly including an elongate piston extending on both sides of the carriage, said piston having ends engageable with the frame and a length extending substantially between engagement points and a length at least as great as the travel of the carriage and having a piston head disposed intermediate the piston ends and a cylinder attached to the carriage for movement of the cylinder and the carriage relative to the piston,
  (d) a vertical lift carriage mounted to the transverse carriage, and
  (e) a vertical ram assembly disposed between the frame and the transverse carriage for movement of the vertical carriage relative to the transverse carriage.

2. A hitch assembly as defined in claim 1, in which:
  (f) the transverse carriage is disposed on a rearward side of the frame and the ram assembly cylinder is disposed on a forward side of the frame.

3. A hitch assembly as defined in claim 1, in which:
  (f) the frame includes opposed outrigger members having end portions extending beyond the upper and lower portions,
  (g) the ram assembly piston extends between said end portions, and
  (h) the ram assembly cylinder is movable lengthwise of the outrigger members.

4. A hitch assembly as defined in claim 1, in which:
  (f) the transverse carriage includes a housing having a lower portion and an upper portion, and
  (g) the vertical ram assembly includes a cylinder mounted within the upper housing portion and having a depending piston connected to the vertical lift carriage.

5. A hitch assembly as defined in claim 1, in which:
  (f) the frame upper portion includes a horizontal rail assembly, and
  (g) the transverse carriage includes an upper roller means engageable with said rail assembly.

6. A hitch assembly as defined in claim 5, in which:

(h) the upper roller means includes opposed side rollers selectively engageable with said rail assembly.

7. A hitch assembly as defined in claim 1, in which:
(f) the frame lower portion includes a horizontal rail assembly, and
(g) the transverse carriage includes an upper roller means and a lower roller means selectively engageable with said rail assembly.

8. A hitch assembly as defined in claim 1, in which:
(f) a ground-engageable support is provided for selectively carrying the vertical lift carriage so that the frame and the attached towing vehicle can be raised relative to said vertical lift carriage.

9. A hitch assembly for attachment to a towing vehicle for towing a trailer, the assembly comprising:
(a) a frame fixedly mounted to the towing vehicle and including an upper portion, a lower portion and means connecting said upper and lower portions,
(b) a transverse carriage mounted to the frame,
(c) a horizontal ram assembly disposed between the frame and the transverse carriage for moving the transverse arriage laterally relative to the frame, said ram assembly including an elongate piston extending on both sides of the carriage and connected at its ends to the frame and having a piston head disposed intermediate the piston ends and a cylinder attached to the carriage for movement of the cylinder and the carriage relative to the piston,
(d) a vertical lift carriage mounted to the transverse carriage,
(e) a vertical ram assembly disposed between the frame and the transverse carriage for movement of the vertical carriage relative to the transverse carriage,
(f) the frame including a web having an elongate horizontal slot,
(g) the transverse carriage being disposed on one side of the web and the ram assembly cylinder is disposed on the other side of the web, and
(h) the attachment of the cylinder to the transverse carriage including means extending through the horizontal slot.

10. A hitch assembly for attachment to a towing vehicle for towing a trailer, the assembly comprising:
(a) a frame mounted to the towing vehicle and including:
  1. an upper horizontal rail assembly,
  2. a lower horizontal rail assembly,
  3. a vertical web extending between said upper and lower rail assemblies and including a horizontal slot,
(b) a transverse carriage mounted to the frame in transversely movable relation and including:
  1. a body disposed on one side of the frame and having a lower portion and an upper portion,
  2. an upper roller assembly carried by the body and adapted to engage the upper rail assembly,
  3. a lower roller assembly carried by the body and adapted to engage the lower rail assembly,
  4. a vertical track,
(c) a transversely extending ram assembly disposed on the other side of the frame web, said assembly including a piston rod having opposed ends attached to the frame, a cylinder movable on the piston and connection means extending through the elongate slot and connecting said cylinder to the carriage body lower portion,
(d) a vertical lift carriage mounted to the transverse carriage in vertically movable relation and including:
  1. a body having an inner portion and an outer portion and a track engageable vertical portion,
  2. a hitch member carried by the outer portion,
(e) a vertically extending ram assembly having upper and lower ends, the upper end being connected to the transverse carriage upper portion and the lower end being connected to the vertical carriage body inner portion.

11. A hitch assembly as defined in claim 10, in which:
(f) the upper rail assembly includes a horizontal rail surface,
(g) the upper roller assembly includes a roller set disposed above the horizontal rail surface and engageable with said rail surface,
(h) the lower rail assembly includes a horizontal rail surface, and
(i) the lower roller assembly includes a roller set disposed above the horizontal rail surface and engageable with said rail surface.

12. A hitch assembly as defined in claim 10, in which:
(f) the lower rail assembly includes a horizontal rail surface, and
(g) the lower roller assembly includes a roller set disposed below the horizontal rail surface and engageable with said rail surface when the frame is moved upwardly relative to the carriage assembly.

13. A hitch assembly as defined in claim 10, in which:
(f) the upper rail assembly includes opposed vertical rail surfaces, and
(g) the upper roller assembly includes opposed side roller sets engageable respectively with said vertical rail surfaces.

14. A hitch assembly as defined in claim 10, in which:
(f) the lower rail assembly includes a vertical rail surface, and
(g) the lower roller assembly includes a side roller set engageable with said vertical rail surface.

15. A hitch assembly as defined in claim 10, in which:
(f) the frame includes a web, an upper downwardly depending member spaced from said web to define an upper track and a lower upwardly extending member spaced from said web to define a lower track, and
(g) the carriage includes a box member having a rear plate and a front plate, and the rear plate including upper and lower edges received respectively by the upper and lower tracks.

16. A hitch assembly as defined in claim 10, in which:
(f) the web slot includes opposed ends and the connecting means between the cylinder and the transverse carriage are engageable with said slot ends to limit lateral movement of the transverse carriage on the frame.

17. A hitch assembly for attachment to a towing vehicle for towing a trailer, the assembly comprising:
(a) a frame fixedly mounted to the towing vehicle and including opposed ends,
(b) a transverse carriage mounted to the frame,
(c) means for moving the transverse carriage relative to the frame including an elongate member mounted between the ends of the frame, the elongate member including ends engageable with the frame and a length extending substantially between engagement points and a length at least as great as the transverse movement of the carriage, movable means carried by the elongate member and attached to the transverse carriage, and means for moving the movable means and the transverse carriage together relative to the frame, (d) a vehicle lift carriage mounted to the transverse carriage, and (e) means for moving the vertical carriage relative to the transverse carriage.

18. A hitch assembly for attachment to a towing vehicle for towing a trailer, the assembly comprising:

(a) a frame fixedly mounted to the towing vehicle and including opposed ends, (b) a transverse carriage mounted to the frame, (c) means for moving the transverse carriage relative to the frame, the transverse moving means engageable with the frame and extending at least intermediate the engagement with the frame, (d) a vehicle lift carriage mounted to the transverse carriage, (e) means for moving the vertical carriage relative to the transverse carriage, and (f) a ground-engageable support stand removably engageable with the hitch assembly and the vertical lift carriage so that the frame and the attached towing vehicle can be raised relative to said vertical lift carriage.

* * * * *